(12) United States Patent
Lin et al.

(10) Patent No.: US 10,307,960 B2
(45) Date of Patent: Jun. 4, 2019

(54) THREE-DIMENSIONAL PRINTER AND IMAGING SYSTEM THEREOF

(71) Applicant: DELTA ELECTRONICS, INC., Taoyuan (TW)

(72) Inventors: Yu-Cheng Lin, Taoyuan (TW); Hsin-Tsung Yeh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 173 days.

(21) Appl. No.: 15/241,062

(22) Filed: Aug. 18, 2016

(65) Prior Publication Data

US 2017/0348913 A1 Dec. 7, 2017

(30) Foreign Application Priority Data

Jun. 7, 2016 (TW) .............................. 105117924 A (51) Int. Cl.

| | |
|---|---|
| *B29C 64/264* | (2017.01) |
| *B33Y 30/00* | (2015.01) |
| *B29C 64/277* | (2017.01) |
| *G02B 13/16* | (2006.01) |

(Continued)

(52) U.S. Cl.
CPC .......... *B29C 64/264* (2017.08); *B29C 64/277* (2017.08); *B33Y 30/00* (2014.12); *G02B 13/16* (2013.01); *G02B 27/141* (2013.01); *G02B 27/149* (2013.01); *B29K 2105/0058* (2013.01)

(58) Field of Classification Search
CPC ..... B29C 64/264; B29C 64/277; B33Y 30/00; G02B 13/16; G02B 27/141
See application file for complete search history.

(56) References Cited

U.S. PATENT DOCUMENTS

| | | | |
|---|---|---|---|
| 5,840,239 A | 11/1998 | Partanen et al. | |
| 2012/0195994 A1* | 8/2012 | El-Siblani .............. | B33Y 10/00 425/174.4 |

FOREIGN PATENT DOCUMENTS

| | | |
|---|---|---|
| CN | 103921444 A | 7/2014 |
| CN | 104260359 A | 1/2015 |
| TW | M501365 U | 5/2015 |

OTHER PUBLICATIONS

"Projection Display Technology" https://www.extremetech.com/electronics/58334-projection-display-technology/4 Oct. 5, 2001. (Year: 2001).*

* cited by examiner

*Primary Examiner* — Jacob T Minskey
*Assistant Examiner* — Melody Tsui
(74) *Attorney, Agent, or Firm* — CKC & Partners Co., LLC (57) ABSTRACT

An imaging system for a three-dimensional printer includes a light source component, at least one pattern determining element, a light splitter, a light directing component, and a lens component. The light source component emits a first light and a second light having different wavelengths. The pattern determining element provides the first light and the second light with a first pattern and a second pattern respectively. The light splitter directs the first light and the second light to different directions respectively. The light directing component guides at least one of the first light and the second light, such that the first light and the second light go to a first plane and a second plane respectively. The lens component includes a first lens group and a second lens group, configured to image the first pattern and the second pattern onto the first plane and the second plane respectively.

13 Claims, 9 Drawing Sheets

(51) Int. Cl.
*G02B 27/14* (2006.01)
*B29K 105/00* (2006.01)

THREE-DIMENSIONAL PRINTER AND IMAGING SYSTEM THEREOF

RELATED APPLICATIONS

This application claims priority to Taiwan Application Serial Number 105117924, filed Jun. 7, 2016, which is herein incorporated by reference.

BACKGROUND

Field of Invention

The present invention relates to a three-dimensional printer and an imaging system thereof.

Description of Related Art

As the development of technologies continues, three-dimensional printing and additive manufacturing (AM) has become one of the most important developing technologies. The above technologies are a type of rapid prototyping technologies, which can directly fabricate a needed product using a digital model file, and the product can be a three-dimensional physical object of almost any shape. In the conventional fields of mold making, industrial design, and so on, three-dimensional printing has been applied in mold fabrication, as well as, three-dimensional printing has gradually been applied to jewelry, shoes, industrial design, architecture, engineering, cars, aviation, dentistry, medical industries, education, civil engineering, and other fields.

SUMMARY

The embodiments of the present invention provide a three-dimensional printer and an imaging system thereof. The imaging system simultaneously or sequentially provides light of different wavelengths to a plurality of planes which are parallel to each other. Through this configuration, the three-dimensional printings of plural objects can be finished simultaneously or within little time difference.

According to one aspect of this invention, an imaging system for a three-dimensional printer includes a light source component, at least one pattern determining element, a light splitter, a light directing component, and a lens component. The light source component is configured to emit a first light having a first wavelength and a second light having a second wavelength along an axial direction, in which the first wavelength is different from the second wavelength. The pattern determining element is configured to provide the first light emitted from the light source component with a first pattern and provide the second light emitted from the light source component with a second pattern. The light splitter is configured to direct the first light and the second light to different directions respectively. The light directing component is configured to guide at least one of the first light and the second light, such that the first light and the second light are transmitted to a first plane and a second plane respectively. The lens component includes a first lens group and a second lens group. The first lens group is configured to image the first pattern of the first light onto the first plane, and the second lens group is configured to image the second pattern of the second light onto the second plane.

In some embodiments of the present invention, the first plane is substantially parallel with the second plane.

In some embodiments of the present invention, the light splitter is configured to reflect the second light to the second plane and transmit the first light, and the light directing component is configured to guide the first light coming from the light splitter to the first plane.

In some embodiments of the present invention, the light source component includes a first light source, a second light source, and a combining element. The first light source is configured to emit the first light. The second light source is configured to emit the second light. The combining element is configured to combine the first light emitted from the first light source and the second light emitted from the second light source into the axial direction.

In some embodiments of the present invention, the light source component comprises a broad band light source, wherein a light emitted form the broad band light source has a spectrum covering the first wavelength and the second wavelength.

In some embodiments of the present invention, the first lens group and the second lens group have different optical powers.

In some embodiments of the present invention, the number of pattern determining elements is two, and the pattern determining elements provide the first light emitted from the light source component with the first pattern and provide the second light emitted from the light source component with the second pattern respectively.

In some embodiments of the present invention, the light directing component includes a first mirror and a second mirror. The first mirror is configured to reflect the first light coming from the light splitter to the first plane. The second mirror is configured to reflect the second light coming from the light splitter to the second plane.

In some embodiments of the present invention, the light source component and the pattern determining element constitute a display panel together.

In some embodiments of the present invention, the light source component emits a third light having a third wavelength different from the first wavelength and the second wavelength, the pattern determining element provides the third light emitted from the light source component with a third pattern, the light splitter directs the third light coming from the pattern determining element to a direction different from that of the first light and the second light, and the third light is transmitted to a third plane.

In some embodiments of the present invention, the light source component includes a first light source, a second light source, a third light source, and a combining element. The first light source is configured to emit the first light. The second light source is configured to emit the second light. The third light source is configured to emit the third light. The combining element is configured to combine the first light emitted from the first light source, the second light emitted from the second light source, and the third light emitted from the third light source into the axial direction.

In some embodiments of the present invention, the combining element is a X-cube prism.

According to one aspect of this invention, a three-dimensional printer includes the imaging system aforementioned, a first forming tank, a second forming tank, a first moving stage, and a second moving stage. The first forming tank is configured to contain a first forming material, in which the first forming material is at least partially disposed at the first plane, and the first forming material is capable of being solidified by absorbing the first light. The second forming tank is configured to contain a second forming material, in which the second forming material is at least partially disposed at the second plane, and the second forming material is capable of being solidified by absorbing the second light. The first moving stage is configured to move inwards or outwards in the first forming tank. The second moving stage is configured to move inwards or outwards in the second forming tank.

In some embodiments of the present invention, the imaging system is disposed above or below a horizontal plane of the first forming tank and a horizontal plane of the second forming tank.

It is to be understood that both the foregoing general description and the following detailed description are by examples, and are intended to provide further explanation of the invention as claimed.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1A:
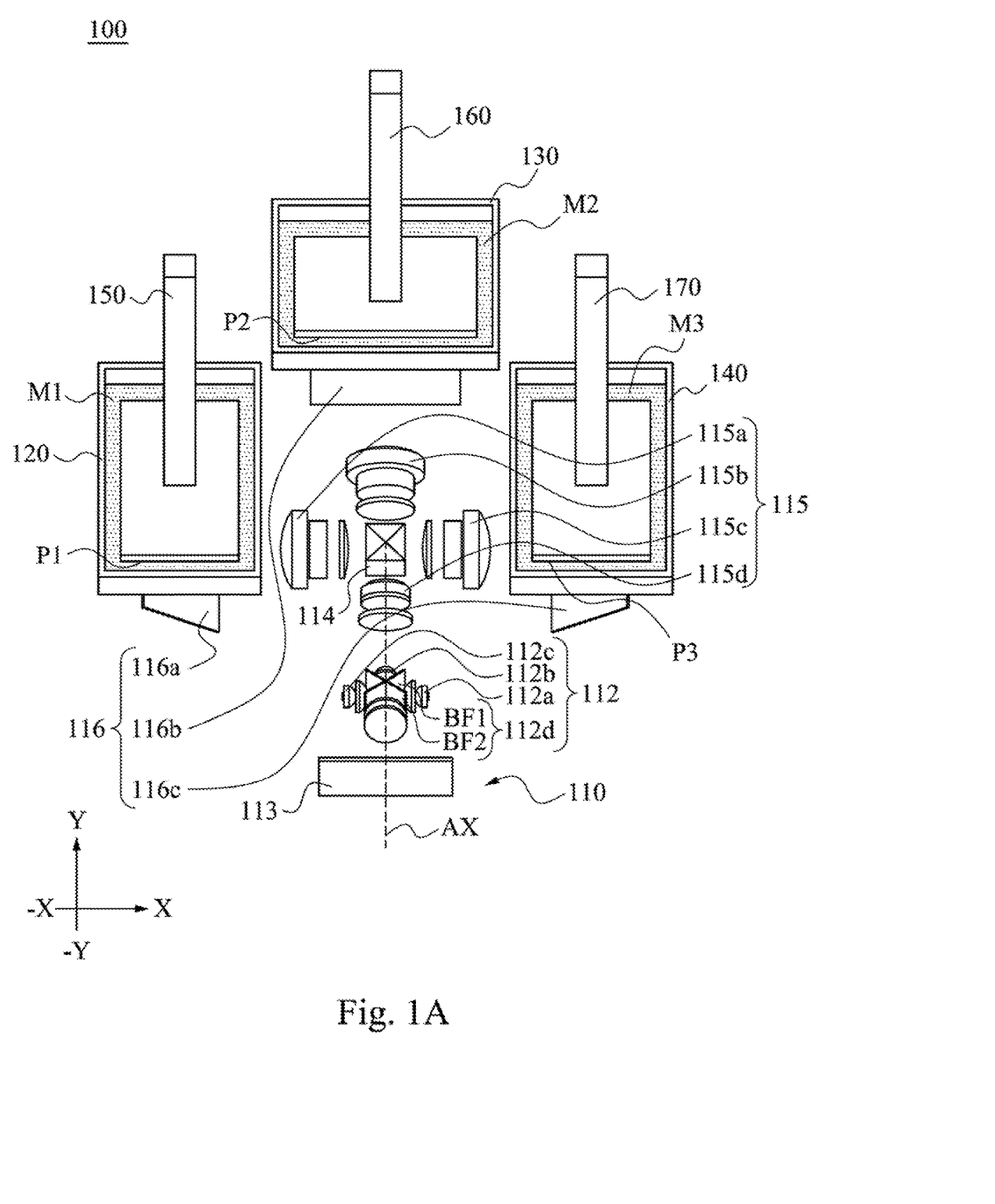
FIG. 1A is a stereoscopic view of a three-dimensional printer according to an embodiment of this invention.

FIG. 1A is a stereoscopic view of a three-dimensional printer 100 according to an embodiment of this invention. The three-dimensional printer 100 includes the imaging system 110 aforementioned, a first forming tank 120, a second forming tank 130, a third forming tank 140, a first moving stage 150, a second moving stage 160, and a third moving stage 170. In the present embodiments, the imaging system 110 provides three lights of different wavelengths, and the three lights bring pattern information. The imaging system 110 emits the lights of different wavelengths to the first forming tank 120, the second forming tank 130, and the third forming tank 140 respectively, and through the movement of the first moving stage 150, the second moving stage 160, and the third moving stage 170, the three-dimensional printing of a plurality objects can be finished simultaneously or within little time difference, such as 2 seconds.

It should be understood that, in the embodiments of the present invention, though the imaging system 100 provides lights of three wavelengths and three sets of optical components are designed correspondingly, the number should not limit the present invention. In some embodiments, the imaging system 100 may only provide lights of two different wavelengths and two sets of optical components are designed correspondingly.

To be specific, the imaging system 100 includes a light source component 112, a pattern determining element 113, a light splitter 114, a lens component 115, and a light directing component 116. The light source component 112 is configured to emit a first light having a first wavelength, a second light having a second wavelength, and a third light having a third wavelength along an axial direction AX, in which the first wavelength, the second wavelength, and the third wavelength are different. Herein, the light source component 112 may emit the first light, the second light, and the third light simultaneously. Alternatively, the light source component 112 may emit the first light, the second light, and the third light sequentially.

In the present embodiments, the light source component 112 includes a first light source 112a, a second light source 112b, a third light source 112c, and a combining element 112d. The first light source 112a is configured to emit the first light. The second light source 112b is configured to emit the second light. The third light source 112c is configured to emit the third light. For example, the first light source 112a, the second light source 112b, and the third light source 112c may be ultra-violet light sources of different wavelengths. The first wavelength may be a range of about 400 nanometers to about 420 nanometers. The second wavelength may be a range of about 460 nanometers to about 480 nanometers. The third wavelength may be a range of about 355 nanometers to about 375 nanometers. In some embodiments, the first wavelength may be about 405 nanometers, the second may be about 470 nanometers, and the third wavelength may be about 365 nanometers. It is appreciated that the wavelengths of the light sources are chosen in accordance with the materials (such as photo initiators) in the forming tanks respectively, and the exemplary values herein should not limit the scope of present invention.

The combining element 112d is configured to combine the first light emitted from the first light source 112a, the second light emitted from the second light source 112b, and the third light emitted from the third light source 112c into the axial direction AX. In the present embodiments, the combining element 112d may be a X-plate, which includes two kinds of band-pass filters BF1 and BF2. For example, the band-pass filter BF1 is used to reflect the first light and transmit the second light and the third light, and the band-pass filter BF2 is used to reflect the third light and transmit the first light and the second light. Of course, it should not limit the scope of the present invention. The combining element 112d may also be a X-cube prism or other element capable of combining lights. Alternatively, in some embodiments, the light source component 112 may also be other light sources suitable of emitting lights of different wavelengths, and the configuration of the combining element 112d can be omitted.

The pattern determining element 113 is configured to provide different patterns sequentially. For example, the pattern determining element 113 may be a digital micro-mirror device (DMD). The DMD is an array of a plurality of micro-mirrors, and each of the mirrors represents a pixel. Each of the mirrors is connected with an independent driver, and a controlling element may respectively turn on or off each of the micro-mirrors, to determine whether a light is sent to a determined position.

Through the DMD, the pattern determining element 113 may provide the first light emitted from the light source component 112 with a first pattern, provide the second light emitted from the light source component 112 with a second pattern, provide the third light emitted from the light source component 112 with a third pattern, and reflect the first light having the first pattern, the second light having the second pattern, and the third light having the third pattern to the light splitter 114 and the lens component 115. Of course, it should not limit the scope of the present invention, the pattern determining element 113 may be other elements suitable of providing patterns, such as spatial light modulator and so on.

The lens component 115 includes a first lens group 115a, a second lens group 115b, a third lens group 115c, and a common incidence lens group 115d. To be specific, the first light, the second light, and the third light transmit through the common incidence lens group 115d and enter the light splitter 114. The light splitter 114 directs the first light, the second light, and the third light to different direction (such as the −X direction, the +Y direction, and the +X direction shown in the figure), such that the first light, the second light, and the third light are sent towards the first lens group 115a, the second lens group 115b, and the third lens group 115c. The first lens group 115a is configured to image the first pattern onto the first plane P1, the second lens group 115b is configured to image the second pattern onto the second plane P2, and the third lens group 115c is configured to image the third pattern onto the third plane P3.

In the present embodiments, the light splitter 114 is configured to separate a plurality of lights, in which the number of lights is the number of the forming tanks. The light splitter 114 may be a three-beam splitter, which reflects the first light (such as about 470 nanometers) and third light (such as about 405 nanometers) to different directions, and transmits the second light (such as about 365 nanometers). Of course, it should not limit the scope of the present invention, and the purpose of separating lights may also be achieved by configuring a plurality of split prisms.

In some embodiments of the present invention, the common incidence lens group 115d is arranged with the first lens group 115a, the second lens group 115b, and the third lens group 115c, such that the first pattern, the second pattern, and the third pattern can form images. Herein, the respective lens groups include a plurality of lenses, which are merely briefly shown in the figures, and the configuration of the figures should not limit the scope of the present invention. In the present embodiments, the first lens group 115a, the second lens group 115b, and the third lens group 115c may have the same optical power of magnification. Alternatively, in other embodiments, as finenesses of the objects to be fabricated are different, the first lens group 115a, the second lens group 115b, and the third lens group 115c may have different optical powers of magnification. In the present embodiments, the first lens group 115a, the second lens group 115b, and the third lens group 115c may respectively magnify the first pattern, the second pattern, and the third pattern to the first plane P1, the second plane P2, and the third plane P3 by different ratios. The pixel size of the imaged patterns formed on the first plane P1, the second plane P2, and the third plane P3 are the finenesses. For example, the finenesses may be in a range from about 50 micrometers to about 100 micrometers. The first pattern, the second pattern, and the third pattern respectively have corresponding imaged patterns. Since the resolutions of the first pattern, the second pattern, and the third pattern are substantially the same, as a result, in the present embodiments, the finenesses mainly vary in accordance to the optical properties (such as optical magnification power) of the first lens group 115a, the second lens group 115b, and the third lens group 115c.

The light directing component 116 is configured to guide the first light, the second light, and the third light coming from the light splitter 114, such that the first light, the second light, and the third light are transmitted to the first plane P1, the second plane P2, and the third plane P3 respectively, in which the first plane P1, the second plane P2, and the third plane P3 are parallel. Herein, the first plane P1, the second plane P2, and the third plane P3 may be deemed as the bottom surface of forming plates disposed at the first moving stage 150, the second moving stage 160, and the third moving stage 170.

In some embodiments of the present invention, the light directing component 116 further includes a first mirror 116a, a second mirror 116b, and a third mirror 116c. The first mirror 116a is configured to reflect the first light coming from the light splitter 114 to the first plane P1. The second mirror 116b is configured to reflect the second light coming from the light splitter 114 to the second plane P2. The third mirror 116c is configured to reflect the third light coming from the light splitter 114 to the third plane P3. It is appreciated that, the light directing component 116 may adopt other optical elements suitable for directing light, such as prisms, and should not be limited to the mirrors.

Herein, the light directing component 116 directs the paths of three lights, but it should not limit the scope of the present invention. In other embodiments, the light splitter 114 may separate the first light from others and directly send the separated first light to the first plane P1, and the light directing component 116 may just direct the second light to the second plane P2 and the third light to the third plane P3.

Through the configuration, the imaging system 110 may form images on the first plane P1, the second plane P2, and the third plane P3 with three kinds of lights with different respective wavelength.

In some embodiments of the present invention, the first forming tank 120 is configured to contain a first forming material M1, in which the first forming material M1 is at least partially disposed at the first plane P1, and the first forming material M1 is capable of being solidified by absorbing the first light. The second forming tank 130 is configured to contain a second forming material M2, in which the second forming material M2 is at least partially disposed at the second plane P2, and the second forming material M2 is capable of being solidified by absorbing the second light. The third forming tank 140 is configured to contain a third forming material M3, in which the third forming material M3 is at least partially disposed at the third plane P3, and the third forming material M3 is capable of being solidified by absorbing the third light. For example, when the first wavelength, the second wavelength, and the third wavelength are about 470 nanometers, 405 nanometers, and 365 nanometers respectively, the first forming material M1 may be photo-curable materials sensitive to light with a wavelength of 470 nanometers, the second forming material M2 may be photo-curable materials sensitive to light with a wavelength of 405 nanometers, and the third forming material M3 may be photo-curable materials sensitive to light with a wavelength of 365 nanometers.

Figure 1B:
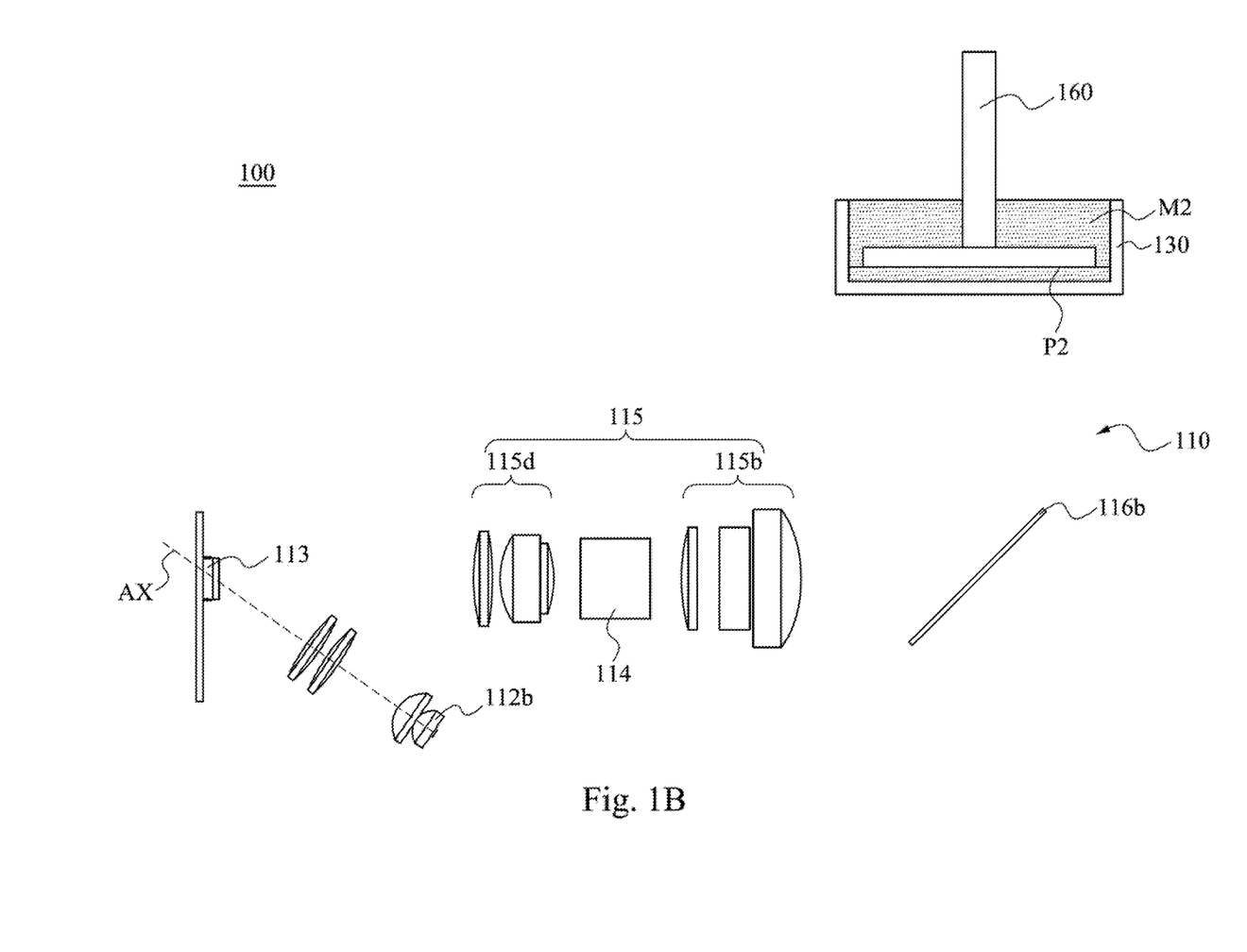
FIG. 1B is a side view of a portion of the three-dimensional printer of FIG. 1A.

FIG. 1B illustrates the mechanism of the three-dimensional printing. FIG. 1B is a side view of a portion of the three-dimensional printer 100 of FIG. 1A. FIG. 1B depicts only a portion of the imaging system 110, the second forming tank 130, and the second moving stage 160 for briefly illustrating one of the methods of operating the three kinds of lights having pattern information of the present embodiments and the three-dimensional printing process corresponding to the kind of light. The methods of operating the other two kinds of lights having pattern information and the three-dimensional printing process corresponding to the two kinds of lights can be deducted from FIG. 1B.

Reference is made to FIG. 1A and FIG. 1B. The imaging system 110 provides the second forming tank 130 with the second light having the second pattern, such that the second forming material M2 is irradiated by the second light, and thereto solidifies with the second pattern to form a second cutting layer proximate to second plane P2. Herein, the second moving stage 160 is configured to provide a planar surface (which is the second plane P2) that the second cutting layer may be attached to. The second moving stage 160 is configured to move upward and outward in the second forming tank 130. Then, through the upward movement of the second moving stage 160, the cutting layer of the second forming material M2 which has solidified at the second plane P2 may leave away from the second plane P2, and the unsolidified second forming material M2 may flow below the second plane P2. After the unsolidified second forming material M2 is irradiated by the second light having another second pattern, the unsolidified second forming material M2 solidifies and forms another cutting layer. Repeating these steps can form a continuous plurality of second cutting layers, and the sum of the continuous second cutting layers may form a second three-dimensional object.

Reference is made back to FIG. 1A. Similarly, the first forming material M1 is irradiated by the first light, and thereto solidifies with the first pattern to form a first cutting layer proximate to the first plane P1. Herein, the first moving stage 150 is configured to provide a planar surface (which is the first plane P1) that the first cutting layer may be attached to. The first moving stage 150 is configured to move upward and outward in the first forming tank 120, such that a continuous plurality of first cutting layers may be formed, and the sum of the continuous plurality of first cutting layers may form a first three-dimensional object.

Similarly, the third forming material M3 is irradiated by the third light, and thereto solidifies with the third pattern to form a third cutting layer proximate to the third plane P3. Herein, the third moving stage 170 is configured to provide a planar surface (which is the third plane P3) that the third cutting layer may be attached to. The third moving stage 170 is configured to move upward and outward in the third forming tank 140, such that a continuous plurality of third cutting layers may be formed, and the sum of the continuous plurality of third cutting layers may form a third three-dimensional object.

Accordingly, in the embodiments of the present invention, the imaging system 110 may simultaneously or sequentially form images at the first plane P1, the second plane P2, and the third plane P3 with three lights of different wavelength respectively. Therefore, the first forming material M1, the second forming material M2, and the third forming material M3 may form the first three-dimensional object, the second three-dimensional object, and the third three-dimensional object respectively, in which the formations are finished at the same or almost the same time.

In the embodiments of the present invention, the sizes of first three-dimensional object, the second three-dimensional object, and the third three-dimensional object varies based on the optical powers of magnification (which is related to finenesses) of the first lens group 115a, the second lens group 115b, and the third lens group 115c and the sizes of the respective patterns provided by the pattern determining element 113. In the embodiments of the present invention, since the respective patterns are provided by the same pattern determining element 113, the sizes of the respective patterns may be considered as a multiplier of the number of pixels and the pixel size of the pattern determining element 113. That is, the number of pixels may determine the sizes of the respective patterns. In some embodiments, a size of a cutting layer is a multiplier of pixel size of the imaged patterns (related to finenesses) and the number of pixels. To be specific, the finenesses (related to pixel size of the imaged patterns) and a size of an object are in inverse proportion, and a size of the pattern provided by the pattern determining element 113 and the size of the object are in direct proportion. For example, if the focal lengths of the first lens group 115a, the second lens group 115b, and the third lens group 115c increase in the sequence, then the finenesses of the first three-dimensional object, the second three-dimensional object, and the third three-dimensional object decrease in the sequence, and the sizes of the first three-dimensional object, the second three-dimensional object, and the third three-dimensional object becomes greater in the sequence.

Usually, for utilizing the pattern determining element 113 as effectively as possible, the sizes (numbers of pixels) of the first pattern, the second pattern, and the third pattern are the greater sizes that the pattern determining element 113 can be operated, and thereto, sizes of the first pattern, the second pattern, and the third pattern are substantially the same. The focal lengths of the respectively lens group can be adjusted mechanically or electronically, so as to achieve the purpose of adjusting the finesse. Herein, the first three-dimensional object, the second three-dimensional object, and the third three-dimensional object can have different sizes, based on the difference of the finenesses (related to pixel size of the imaged patterns) designed by the respective lens groups. To be specific, the higher the finenesses, the smaller the size of objects.

In some circumstances, the optical properties of the respectively lens groups may be determined and the finenesses (related to pixel size of the imaged patterns) are designed initially, and only portions of the pattern determining element 113 are selected to operate. Through the configuration, the first pattern, the second pattern, and the third pattern are designed to have difference sizes, and thereto obtain the first three-dimensional object, the second three-dimensional object, and the third three-dimensional object with desired sizes.

In some embodiments, the finenesses (related to pixel size of the imaged patterns) and the sizes provided by the pattern determining element 113 are adjustable. By setting the above two features, the first three-dimensional object, the second three-dimensional object, and the third three-dimensional object with desired sizes may be obtained.

In the embodiments of the present invention, the appearances of the first three-dimensional object, the second three-dimensional object, and the third three-dimensional object vary in accordance the first pattern, the second pattern, and the third pattern. In an embodiment, when the light source component 112 produces the first light, the second light, and the third light simultaneously, the first pattern, the second pattern, and the third pattern provided by the pattern determining element 113 to the three lights are substantially the same, thereby producing the first three-dimensional object, the second three-dimensional object, and the third three-dimensional object of the same appearances. In another embodiment, when the light source component 112 produces the first light, the second light, and the third light time-sequentially, the pattern determining element 113, the first pattern, the second pattern, and the third pattern provided by the pattern determining element 113 to the three lights may be substantially the same, thereby producing the first three-dimensional object, the second three-dimensional object, and the third three-dimensional object of the same appearances. In still another embodiment, when the light source component 112 produces the first light, the second light, and the third light time-sequentially, the pattern determining element 113, the first pattern, the second pattern, and the third pattern provided by the pattern determining element 113 to the three lights may be different, thereby producing the first three-dimensional object, the second three-dimensional object, and the third three-dimensional object of different appearances.

Figure 1C:
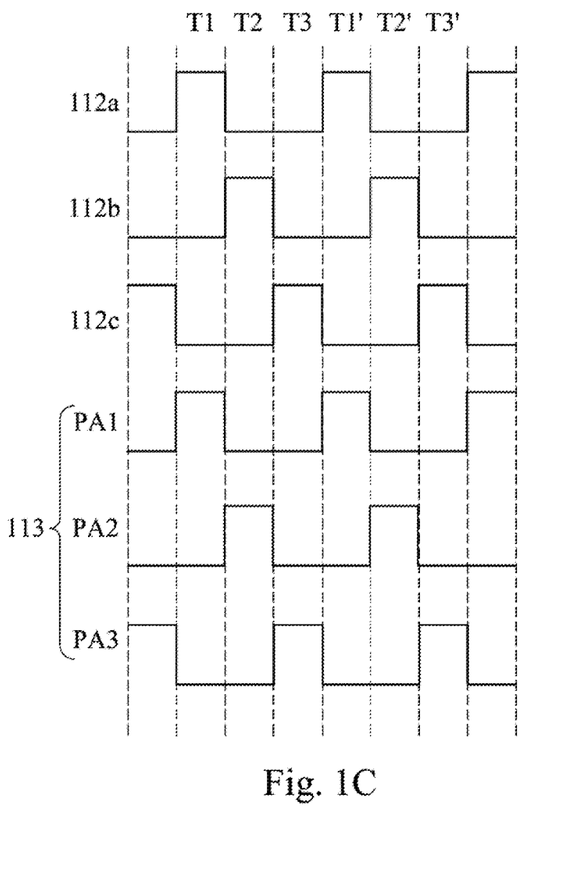
FIG. 1C is a signal diagram showing an operation of a three-dimensional printer according to an embodiment of this invention.

FIG. 10 illustrate the embodiments where three lights with different patterns are produced time-sequentially.

FIG. 10 is a signal diagram showing an operation of a three-dimensional printer 100 according to an embodiment of this invention. Reference is made to both FIG. 1A and FIG. 10. In the present embodiments, the three-dimensional printer 100 can form different objects in substantially the same time. The light source component 112 may provide the first light, the second light, and the third light at different times. For example, the light source component 112 produces the first light at the timings T1 and T1' by the first light source 112a, produces the second light at the timings T2 and T2' by the second light source 112b, and produces the third light at the timings T3 and T3' by the third light source 112c. The timings T1, T2, and T3 are different timings of one period, and the timings T1', T2', and T3' are different timings of another period. It is appreciated that, in the embodiments of the present invention, there are many operating methods to sequentially provide different lights, and thereto switching on or off the first light source 112a, the second light source 112b, or the third light source 112c sequentially should not limit the scope of the present invention.

The pattern determining element 113 provides different patterns sequentially. For example, pattern determining element 113 provides a series of first patterns PA1 at the timings T1 and in which the two first patterns PA1 forms two adjacent cutting layers of a certain first three-dimensional object. The pattern determining element 113 provides a series of second patterns PA2 at the timings T2 and T2', in which the two second patterns PA2 forms two adjacent cutting layers of a certain second three-dimensional object. The pattern determining element 113 provides a series of third patterns PA3 at the timings T3 and T3', in which the two third patterns PA3 forms two adjacent cutting layers of a certain third three-dimensional object. The first patterns PA1, the second patterns PA2, and the third patterns PA3 are different.

In the present embodiments, the light splitter 114 send the first light to the first plane P1, the second light to the second plane P2, and the third light to the third plane P3 respectively at different timings. Through the configuration, the first forming material M1 forms two first cutting layers at the first plane P1 at the timings T1 and T1' layer respectively, the second forming material M2 forms two second cutting layers at the second plane P2 at the timings T2 and T2' layer respectively, and the third forming material M3 forms two third cutting layers at the third plane P3 at the timings T3 and T3' layer respectively.

Through the configuration, in each period, a cutting layer of each of the three-dimensional objects can be formed. After a plurality of cutting layers are accumulated, the first three-dimensional object, the second three-dimensional object, and the third three-dimensional object of different structures can be formed in substantially the same time (which means there may be a time difference within one period). That is, the first three-dimensional object may be formed at the timing T1 of the final period, the second three-dimensional object may be formed at the timing T2 of the final period, and the third three-dimensional object may be formed at the timing T3 of the final period. The first three-dimensional object, the second three-dimensional object, and the third three-dimensional object have different appearances.

Figure 2:
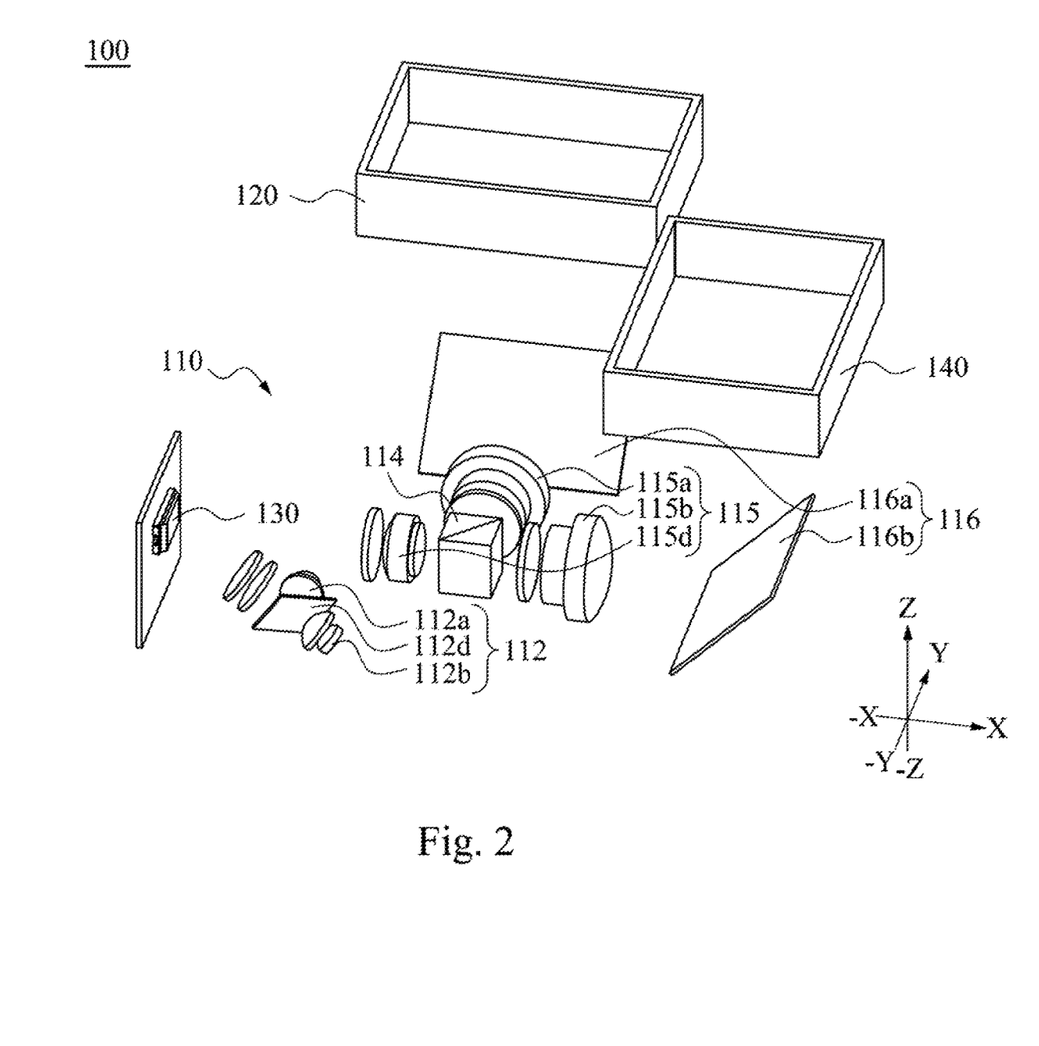
FIG. 2 is a stereoscopic view of a three-dimensional printer according to another embodiment of this invention.

FIG. 2 is a stereoscopic view of a three-dimensional printer 100 according to another embodiment of this invention. The three-dimensional printer 100 of the present embodiments is similar to the three-dimensional printer 100 of FIG. 1A, but the difference therebetween is that: in the present embodiments, the number of the forming tanks are two, and the light splitter 114 is suitable for separating two kinds of light from each other.

In the present embodiments, the light splitter 114 may be a dichroic mirror, which may reflect the first light (such as blue light) and transmit the second light (such as green light). Alternatively, the light splitter 114 may be another dichroic mirror, which may reflect the second light (such as blue light) and transmit the first light (such as green light).

In the present embodiments, the light splitter 114 may direct the separated lights to +X direction and +Y direction. The light directing component 116 may include the first mirror 116a and the second mirror 116b, such that the first light and the second light are sent to the first forming tank 120 and the second forming tank 130 respectively. In other embodiments, the light splitter 114 may direct the separated lights to +X direction and +Z direction, such that the light splitter 114 reflects the first light to the first plane P1 along the +Z direction, and transmits the second light. Through the configuration, the light directing component 116 may only include the second mirror 116b configured to reflect the second light coming from the light splitter 114 to the second plane P2.

In the present embodiments, the configuration of the third light source in the light source component 112 may be omitted, and the light source component 112 may only include the first light source 112a, the second light source 112b, and the combining element 112d. The combining element 112d may be a dichroic mirror. In some embodiments of the present invention, based on the relative positions between the first light source 112a and the combining element 112d and between the second light source 112b and the combining element 112d, the combining element 112d may have different properties. For example, the combining element 112d may reflect the first light (such as blue light) and transmit the second light (such as green light). Alternatively, the combining element 112d may reflect the second light (such as green light) and transmit the first light (such as blue light). Alternatively, in other embodiments, the combining element 112d may reflect the first light (such as blue light) and the second light (such as green light).

Other details of the present embodiments are substantially the same as that of the embodiments of FIG. 1A, and thereto not repeated herein.

Figure 3:
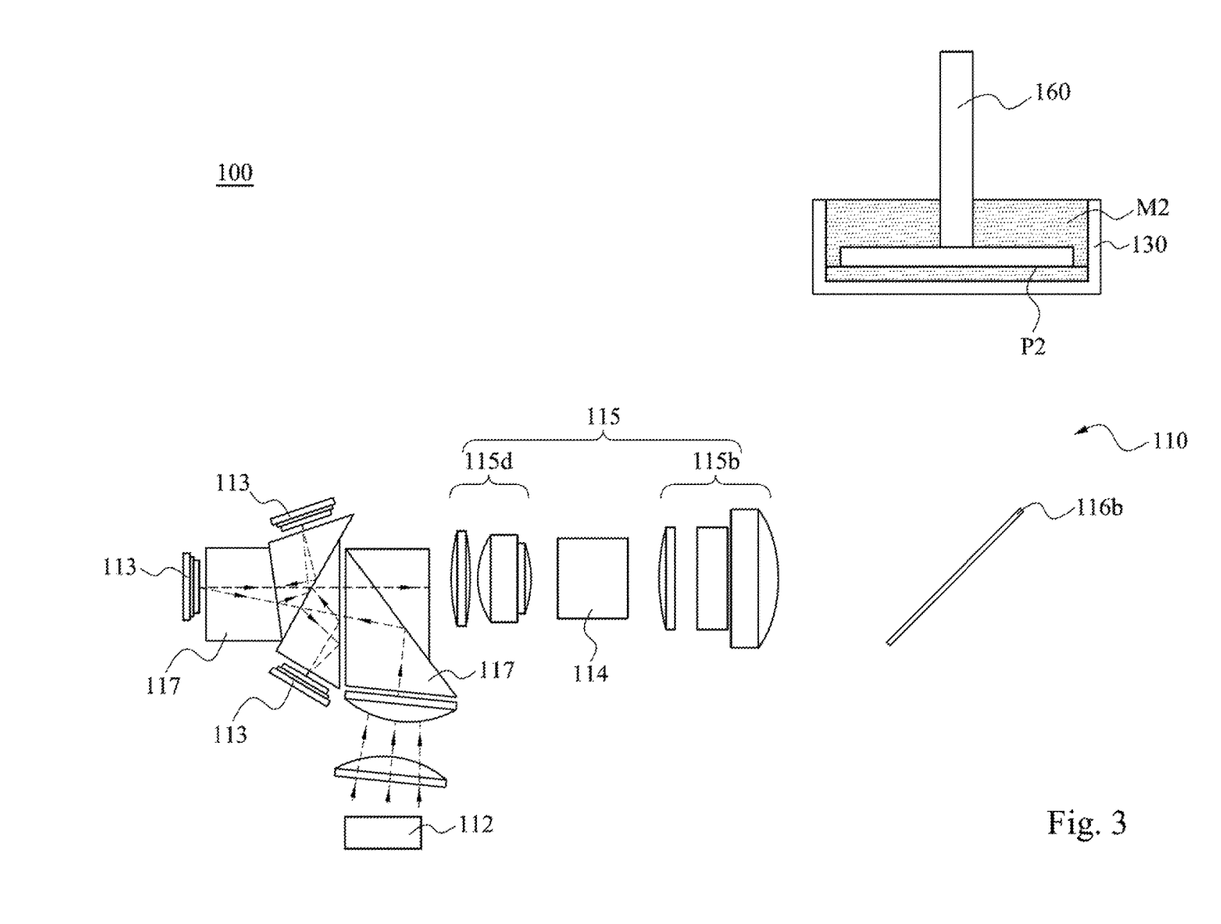
FIG. 3 is a side view of a three-dimensional printer according to another embodiment of this invention.

FIG. 3 is a side view of a three-dimensional printer 100 according to another embodiment of this invention. The three-dimensional printer 100 of the present embodiments is similar to the three-dimensional printer 100 of FIG. 1A, but the difference therebetween is that: in the present embodiments, the three-dimensional printer 100 further includes plural split prisms 117, and the number of the pattern determining element 113 are three. The split prisms 117 is configured to separate the light emitted from the light source component 112 into three lights of different wavelengths, and the lights of different wavelengths are transmitted to the pattern determining elements 113 respectively and therefore have different pattern information. The split prisms 117 combine the lights of different wavelengths having different pattern information into one optical path, and thereby the lights are then sent to the lens component 115 and the light splitter 114.

Afterwards, through the light splitter 114, the lights are respectively directed to the first forming tank 120 (referring to FIG. 1A), the second forming tank 130, and the third forming tank 140 (referring to FIG. 1A).

In the present embodiments, FIG. 3 only depicts a portion of the imaging system 110, second forming tank 130, and the second moving stage 160 for briefly illustrating one of the methods of operating the three kinds of lights having pattern information of the present embodiments and the three-dimensional printing process corresponding to the kind of light. The whole structure configuration of the three-dimensional printer 100 including plural forming tanks may be inferred from FIG. 3 in accompany with FIG. 1A.

Through the configuration, for fabricating the first object, the second object, and the third object of different appearances, the three pattern determining elements 113 may provide the first pattern, the second pattern, and the third pattern of different patterns respectively. The imaging system 110 may simultaneously provide the first light with the first pattern, the second light with the second pattern, and the third light with the third pattern. Since the lights having different pattern information, objects of different appearances may be formed. The operating method shown herein is different from the that shown in FIG. 1C, in which the same pattern determining element 113 sequentially provides the first pattern, the second pattern, and the third pattern of different patterns, and works with the time-sequential light source component 112.

Other details of the present embodiments are substantially the same as that of the embodiments of FIG. 1A, and thereto not repeated herein.

Figure 4:
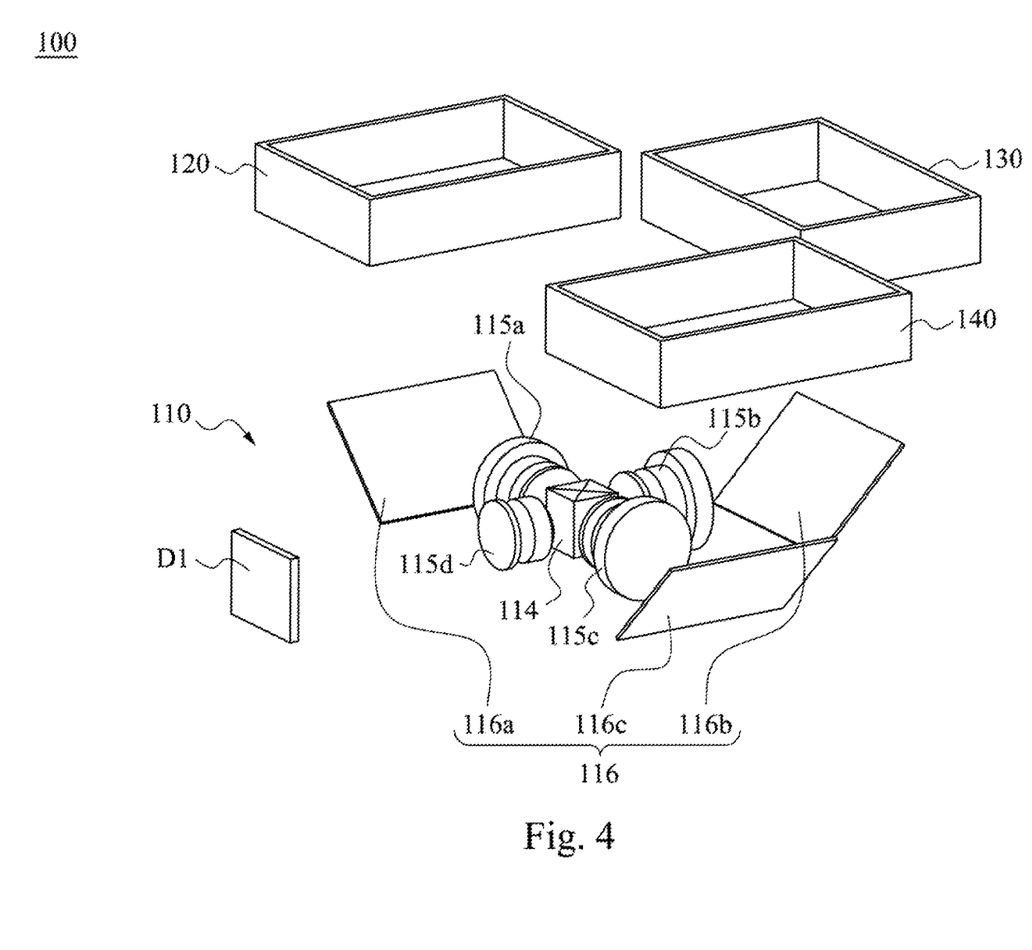
FIG. 4 is a stereoscopic view of a three-dimensional printer according to another embodiment of this invention.

FIG. 4 is a stereoscopic view of a three-dimensional printer according to another embodiment of this invention. The three-dimensional printer 100 of the present embodiments is similar to the three-dimensional printer 100 of FIG. 1A, but the difference therebetween is that: in the present embodiments, the light source component (referring to FIG. 1A) and the pattern determining element (referring to FIG. 1A) constitute a display panel D1 together. A Liquid crystal display (LCD) is taken as an example. The backlight module of the LCD may be referred to as the light source component, and the liquid crystal layer and the pixel array of the LCD may be referred to as the pattern determining element. The display panel D1 may directly provide lights of respectively different wavelengths with different pattern information.

Other details of the present embodiments are substantially the same as that of the embodiments of FIG. 1A, and thereto not repeated herein.

Figure 5:
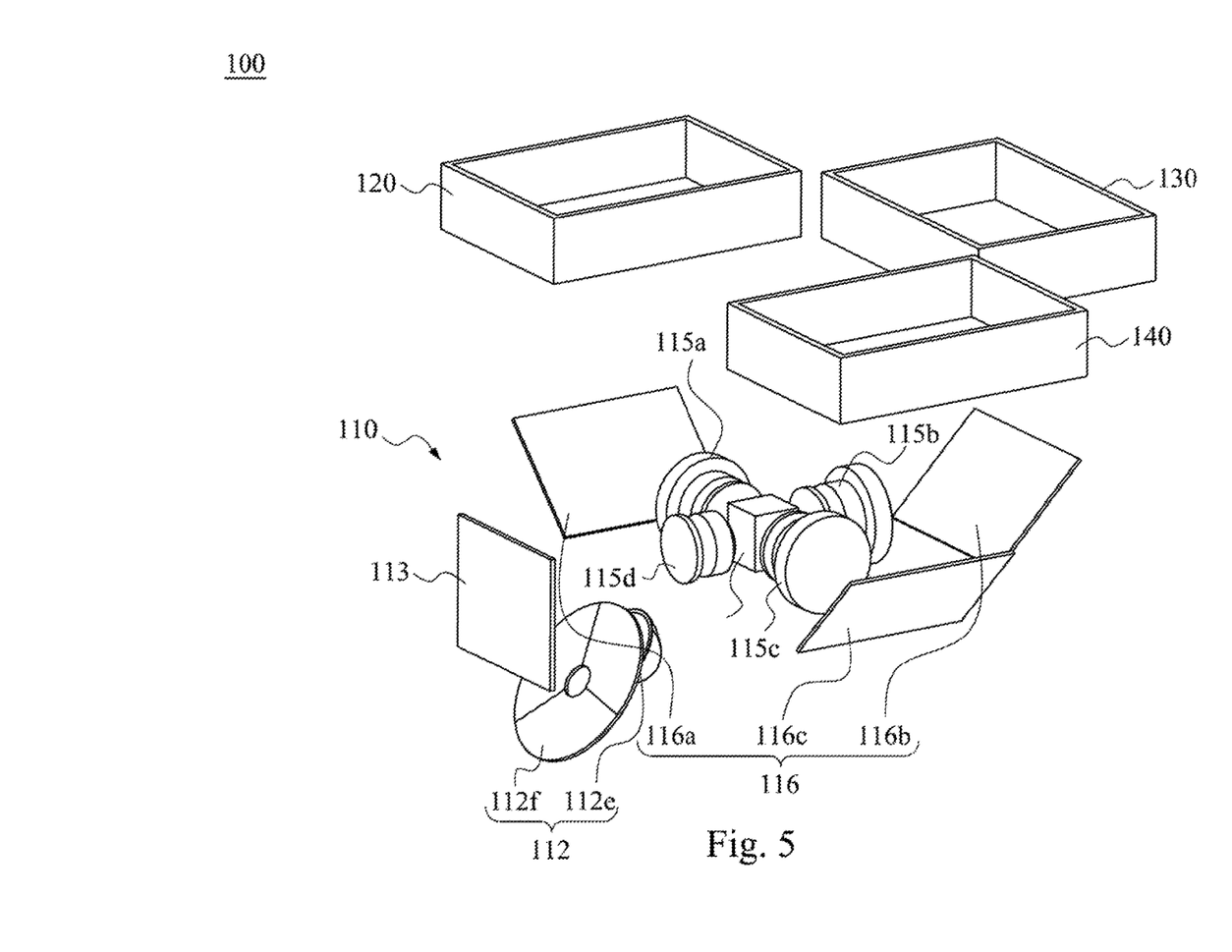
FIG. 5 is a stereoscopic view of a three-dimensional printer according to another embodiment of this invention.

FIG. 5 is a stereoscopic view of a three-dimensional printer 100 according to another embodiment of this invention. The three-dimensional printer 100 of the present embodiments is similar to the three-dimensional printer 100 of FIG. 1A, but the difference therebetween is that: in the present embodiments, the light source component 112 includes a broad band light source 112e, in which a light emitted form the broad band light source 112e has a spectrum covering the first wavelength, the second wavelength, and the third wavelength.

In some embodiments, the light source component 112 may optionally include a color wheel 112f, configured to make the light source component 112 provides lights of different wavelengths sequentially. The color wheel 112f includes plural color filters. For example, as shown in the figure, three color filters are configured corresponding to the first light, the second light, and the third light. In the absence of the color wheel 112f, the light source component 112 provides lights of different wavelengths simultaneously.

Other details of the present embodiments are substantially the same as that of the embodiments of FIG. 1A, and thereto not repeated herein.

Figure 6:
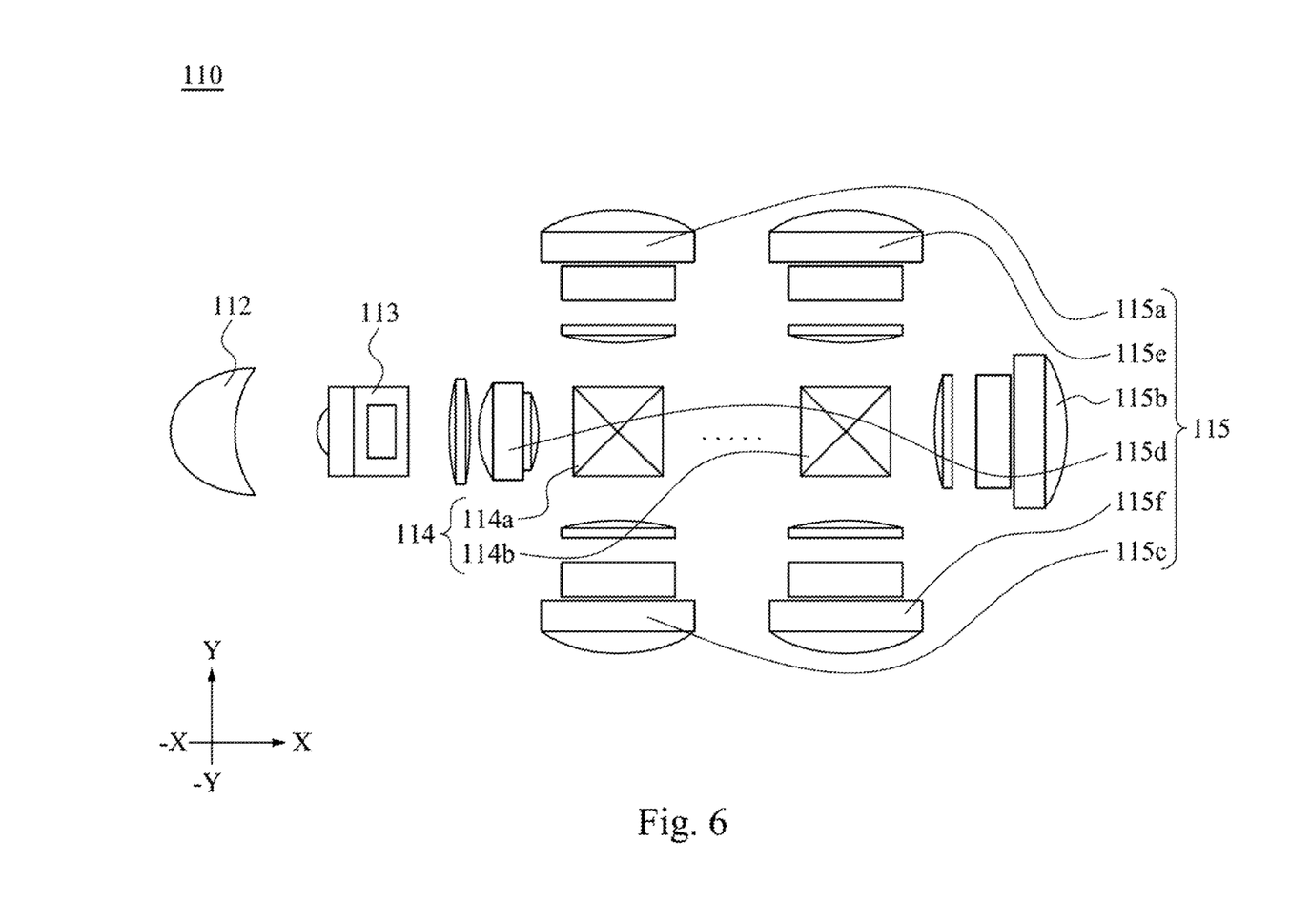
FIG. 6 is a top view of an imaging system of a three-dimensional printer according to another embodiment of this invention.

FIG. 6 is a top view of an imaging system 110 of a three-dimensional printer according to another embodiment of this invention. The imaging system 110 of the present embodiments is similar to the imaging system 110 of FIG. 5, but the difference therebetween is that: in the present embodiments, the imaging system 110 includes a plurality of light splitters 114a and 114b, and the light splitters 114a and 114b work with each other to output more than three separated lights.

For example, the light splitter 114a receives the light coming form the light source component 112 and the pattern determining element 113, in which the light splitter 114a may reflect the lights of wavelengths of $\lambda_n$ and $\lambda_0$ to +Y direction and −Y direction respectively, and transmit the light of wavelength between $\lambda_n$ to $\lambda_0$. The light splitter 114b receive the light (of wavelength between $\lambda_n$ to $\lambda_0$) coming form the light splitter 114a, in which the light splitter 114b may reflect the lights of wavelengths of $\lambda_{n-1}$ and $\lambda_1$ to +Y direction and −Y direction respectively, and transmit the light of wavelength between $\lambda_{n-1}$ to $\lambda_1$, such as $\lambda_{n/2}$. Herein, the wavelengths has a value scaling in a sequence: $\lambda_n > \lambda_{n-1} > \lambda_{n/2} > \lambda_1 > \lambda_0$. Thereby, the first lens group 115a, the second lens group 115b, the third lens group 115c, the fourth third lens group 115e, and the fifth third lens group 115f are designed correspondingly, and the imaging system 110 may operate with at least five kinds of forming tanks and forming materials.

It is appreciated that, though only two light splitters 114a and 114b and five separated lights are exemplarily shown herein, it should not limit the scope of the present invention. The mark " . . . " depicted in the figure indicates the possibility of the configuration of more light splitters and lens groups. In actual application, more lights of different wavelengths may be used to fabricate a plurality of three-dimensional objects by the same pattern determining element.

Herein, the light source component 112 may be any aforementioned configurations, which produces light of wavelengths of $\lambda_n$ and $\lambda_0$ and light of wavelengths between $\lambda_n$ to $\lambda_0$. Other details of the present embodiments are substantially the same as that of the embodiments of FIG. F, and thereto not repeated herein.

In the embodiments of the present invention, the imaging system 110 is disposed below the first forming tank, the second forming tank, and the third forming tank, such that the first forming tank, the second forming tank, and the third forming tank are irradiated by the light emitted from the bottom, in which the three-dimensional printer 100 adopts the irradiation of the bottom light. The first moving stage, the second moving stage, and the third moving stage moves upward from the first forming tank, the second forming tank, and the third forming tank, such that the plurality of three-dimensional objects are formed. However, it should not limit the scope of the present invention.

Figure 7:
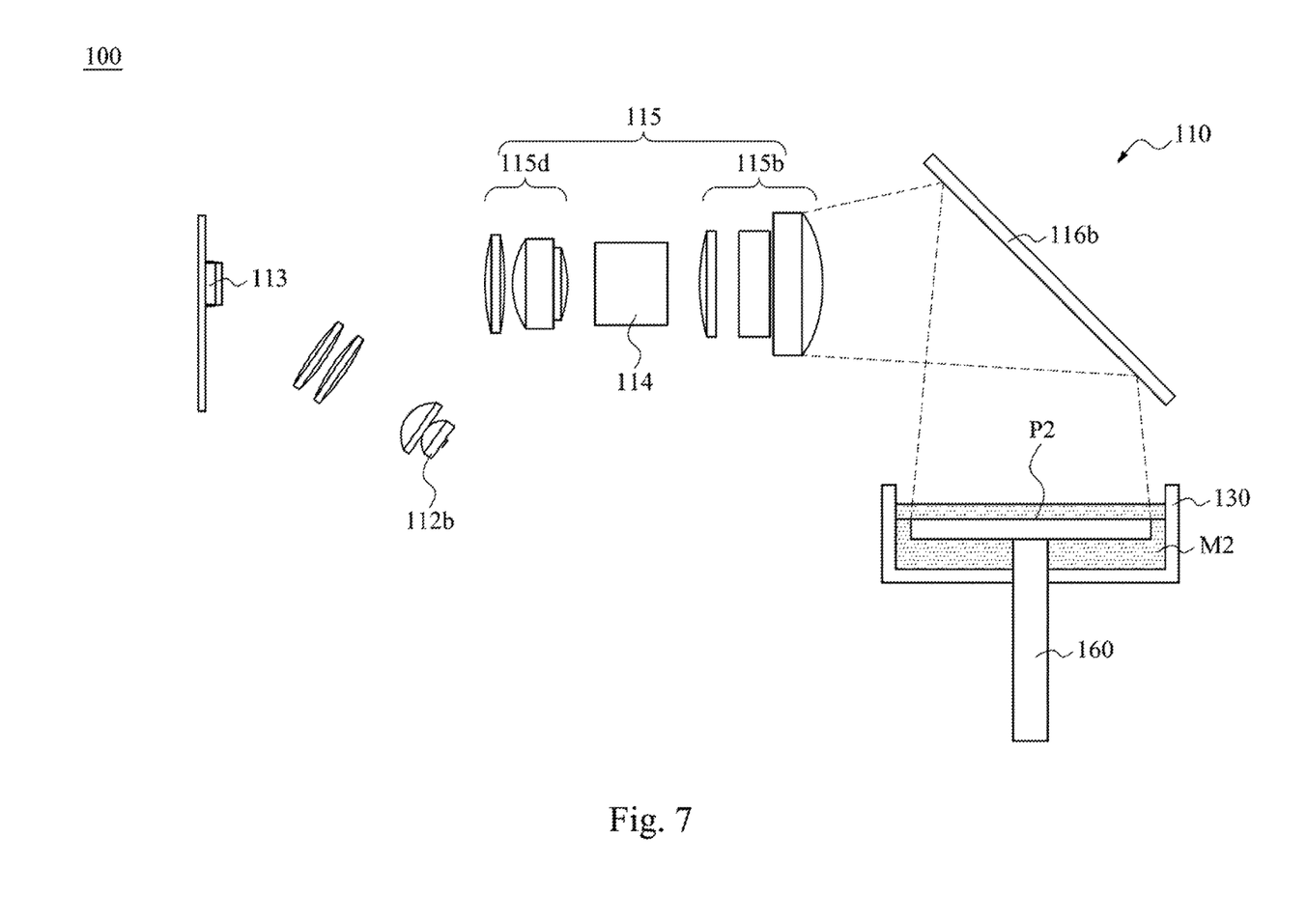
FIG. 7 is a side view of a three-dimensional printer according to another embodiment of this invention.

FIG. 7 is a side view of a three-dimensional printer 100 according to another embodiment of this invention. The three-dimensional printer 100 of the present embodiments is similar to the three-dimensional printer 100 of FIG. 1A, but the difference therebetween is that: in the present embodiments, the three-dimensional printer 100 adopts the irradiation of top light.

In the present embodiments, FIG. 7 depicts only a portion of the imaging system 110, the second forming tank 130, and the second moving stage 160 for briefly illustrating one of the methods of operating the three kinds of lights having pattern information of the present embodiments and the three-dimensional printing process corresponding to the kind of light. The methods of operating the other two kinds of lights having pattern information and the three-dimensional printing process corresponding to the two kinds of lights can be deducted from FIG. 7.

As illustrated previously, the three-dimensional printer 100 includes the imaging system 110 aforementioned, the first forming tank (not shown), the second forming tank 130, the third forming tank (not shown), the first moving stage (not shown), the second moving stage 160, and the third moving stage (not shown). In the present embodiments, the imaging system 110 provides three lights of different wavelengths having pattern information, and the imaging system 110 send the lights of different wavelengths to the first forming tank (not shown), the second forming tank 130, and the third forming tank (not shown) respectively. Through the movement of the first moving stage (not shown), the second moving stage 160, and the third moving stage (not shown), the three-dimensional printings of three objects can be finished simultaneously or within little time difference, such as 2 seconds.

The imaging system 110 is disposed above the first forming tank (not shown), the second forming tank 130, and the third forming tank (not shown). The first moving stage (not shown) is configured to move inward in the first forming tank (not shown), the second moving stage 160 is configured to move inward in the second forming tank 130, and the third moving stage (not shown) is configured to move inward in the third forming tank (not shown).

Other details of the present embodiments are substantially the same as that of the embodiments of FIG. 1A, and thereto not repeated herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A three-dimensional printer, comprising:
   an imaging system, comprising:
   a light source component, configured to emit a first light having a first wavelength and a second light having a second wavelength along an axial direction, wherein the first wavelength is different from the second wavelength;
   at least one pattern determining element, configured to provide the first light emitted from the light source component in the axial direction with a first pattern and provide the second light emitted from the light source component in the axial direction with a second pattern;
   a light splitter, configured to direct the first light and the second light to different directions respectively;
   a light directing component, configured to guide at least one of the first light and the second light, such that the first light and the second light are transmitted to a first plane and a second plane respectively; and
   a lens component, comprising a first lens group and a second lens group, wherein the first lens group is configured to image the first pattern of the first light onto the first plane, and the second lens group is configured to image the second pattern of the second light onto the second plane;
   a first forming tank, configured to contain a first forming material, wherein the first forming material is at least partially disposed at the first plane, and the first forming material is capable of being solidified by absorbing the first light;
   a second forming tank, configured to contain a second forming material, wherein the second forming material is at least partially disposed at the second plane, and the second forming material is capable of being solidified by absorbing the second light;
   a first moving stage, configured to move inwards or outwards in the first forming tank; and
   a second moving stage, configured to move inwards or outwards in the second forming tank.

2. The three-dimensional printer of claim 1, wherein the imaging system is disposed above or below a horizontal plane of the first forming tank and a horizontal plane of the second forming tank.

3. The three-dimensional printer of claim 1, wherein the first plane is substantially parallel with the second plane.

4. The three-dimensional printer of claim 1, wherein the light splitter is configured to reflect the second light to the second plane and transmit the first light, and the light directing component is configured to guide the first light coming from the light splitter to the first plane.

5. The three-dimensional printer of claim 1, wherein the light source component comprises:
   a first light source, configured to emit the first light;
   a second light source, configured to emit the second light; and
   a combining element, configured to combine the first light emitted from the first light source and the second light emitted from the second light source into the axial direction.

6. The three-dimensional printer of claim 1, wherein the light source component comprises a broad band light source, wherein a light emitted form the broad band light source has a spectrum covering the first wavelength and the second wavelength.

7. The three-dimensional printer of claim 1, wherein the first lens group and the second lens group have different optical powers.

8. The three-dimensional printer of claim 1, wherein the number of pattern determining element is two, and the pattern determining elements provide the first light emitted from the light source component with the first pattern and provide the second light emitted from the light source component with the second pattern respectively.

9. The three-dimensional printer of claim 1, wherein the light directing component comprises:
   a first mirror, configured to reflect the first light coming from the light splitter to the first plane; and
   a second mirror, configured to reflect the second light coming from the light splitter to the second plane.

10. The three-dimensional printer of claim 1, wherein the light source component and the pattern determining element constitute a display panel together.

11. The three-dimensional printer of claim 1, wherein the light source component emits a third light having a third wavelength different from the first wavelength and the second wavelength, the pattern determining element provides the third light emitted from the light source component with a third pattern, the light splitter directs the third light coming from the pattern determining element to a direction different from that of the first light and the second light, and the third light is transmitted to a third plane.

12. The three-dimensional printer of claim 11, wherein the light source component comprises:
   a first light source, configured to emit the first light;
   a second light source, configured to emit the second light;
   a third light source, configured to emit the third light; and
   a combining element, configured to combine the first light emitted from the first light source, the second light emitted from the second light source, and the third light emitted from the third light source into the axial direction.

13. The three-dimensional printer of claim 12, wherein the combining element is a X-cube prism.

* * * * *